United States Patent [19]

Sasaki et al.

[11] Patent Number: 4,591,878

[45] Date of Patent: May 27, 1986

[54] THERMAL PRINTER

[75] Inventors: Akira Sasaki; Kazuyuki Mashiko; Shouji Saitoh; Akiyoshi Hakoyama, all of Hitachi, Japan

[73] Assignee: Hitachi, Ltd., Tokyo, Japan

[21] Appl. No.: 649,655

[22] Filed: Sep. 12, 1984

[30] Foreign Application Priority Data

Sep. 13, 1983 [JP] Japan .................. 58-167619

[51] Int. Cl.$^4$ .................. H04N 1/393; H04N 1/21
[52] U.S. Cl. .................. 346/76 PH; 400/120; 358/287
[58] Field of Search .................. 358/287, 77; 364/519; 400/118–121, 124–125.1, 126; 219/216 PH; 346/76 PH, 76 R, 76 L, 153.1, 154, 155, 139 R

[56] References Cited

FOREIGN PATENT DOCUMENTS 0109765 8/1981 Japan .................. 400/124

OTHER PUBLICATIONS

IBM Technical Disclosure Bulletin, vol. 25, No. 7B, Dec. 1982, by Leontiades, p. 3699.

Primary Examiner—A. Evans
Attorney, Agent, or Firm—Antonelli, Terry & Wands

[57] ABSTRACT

A thermal printer comprising a print head having many thermal resistors, a movable carriage with the print head mounted thereon, and a ribbon cassette mounted on the carriage. Print data transmitted from a host system, such as a personal computer, in the form of character code is conducted through a processor into character buffers separately for each line, the print data are transformed into dot-matrix data by character generators CG(L) and CG(S), the converted dot matrix data for two lines are stored through the processor into a dot line buffer, the contents of the dot line buffer are transferred to a shift register, and a head driver for the thermal resistors is activated in response to data from the shift register.

1 Claim, 11 Drawing Figures

THERMAL PRINTER

BACKGROUND OF THE INVENTION

The present invention relates to a thermal printer and, particularly, to a thermal printer which is useful for listing personal computer outputs in which speed-up is requested, and is effective in reducing the running cost by saving the inked ribbon and paper or thermosensitive paper in applications where leaving a record is the sole purpose rather than pursuing a high print quality.

Conventional thermal printers are less capable in the matter of speed than wire dot-matrix printers. For frequent listing operations in personal computer applications, the print speed is a prime requisite to be fulfilled even at the sacrifice of the print quality. Conventional thermal printers are capable of high precision printing, but have difficulty in speeding up the operation. In addition, these printers have a shortcoming of high running cost per print due to the use of the expensive inked ribbon.

SUMMARY OF THE INVENTION

It is an object of the present invention to solve the foregoing prior art deficiencies and provide a thermal printer wherein the print speed is doubled for the case where the print quality is of little importance by simply arranging dot-matrix characters so that a plurality of lines are printed simultaneously, and wherein the consumption of expensive inked ribbon, which is a demerit of thermal transfer printers, is halved.

The printer output falls into two categories, one being a print in which the pring quality is important, such as the cases of printing documents and graphic patterns, the other being a print providing just a visible record, such as the cases of listing personal computer outputs. The thermal printer operates slow, but it features to print any fine character clearly. The present invention contemplates to make the dot-matrix arrangement simpler than conventional ones so that two or more lines can be printed simultaneously, thereby speeding up the operation and saving the use of inked ribbon.

The invention resides in a thermal printer comprising a print head having thermal resistors, a carriage for moving the print head, a character generator, and a controller for controlling the print operation, wherein the controller is provided with a control means for printing a plurality of lines simultaneously in a dot-matrix arrangement of characters in a height half or less than that of usual printed characters.

BRIEF DESCRIPTION OF THE DRAWINGS

The present invention will be apparent from the following detailed description taken in conjunction with the accompanying drawings, in which.

DESCRIPTION OF THE PREFERRED EMBODIMENTS

Embodiments of the inventive thermal printer will now be described with reference to the drawings.

Figure 1:
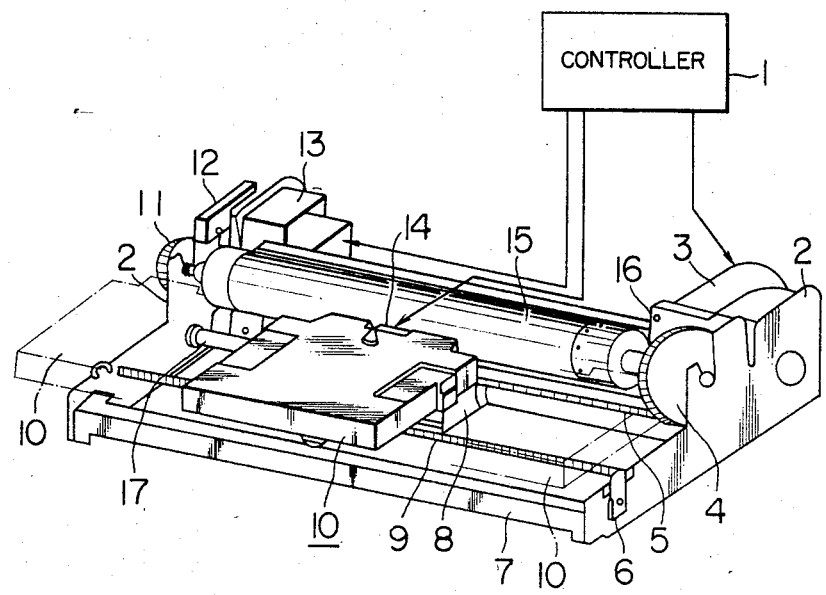
FIG. 1 is a perspective view of the thermal transfer printer embodying the present invention.
Figure 2:
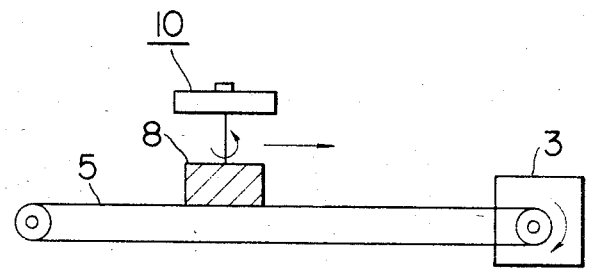
FIG. 2 is an illustration used to explain the carriage drive system of the printer.
Figure 3:
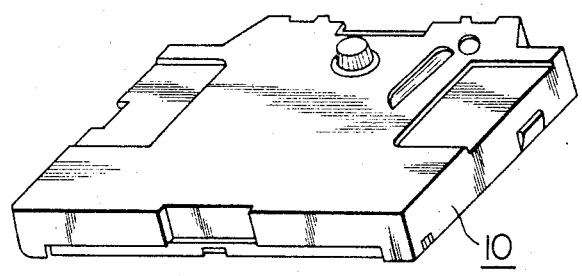
FIG. 3 is an enlarged perspective view of the ribbon cassette of the printer.
Figure 4:
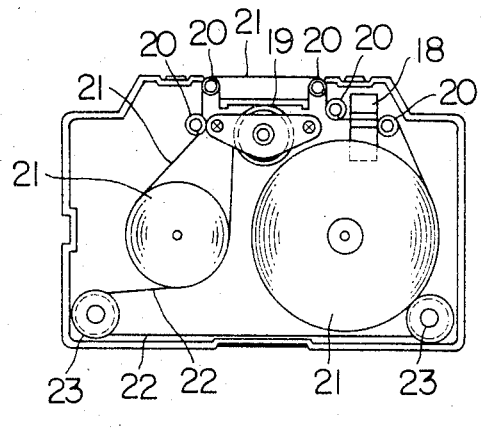
FIG. 4 is a diagram showing the internal arrangement of the ribbon cassette.
Figure 5:
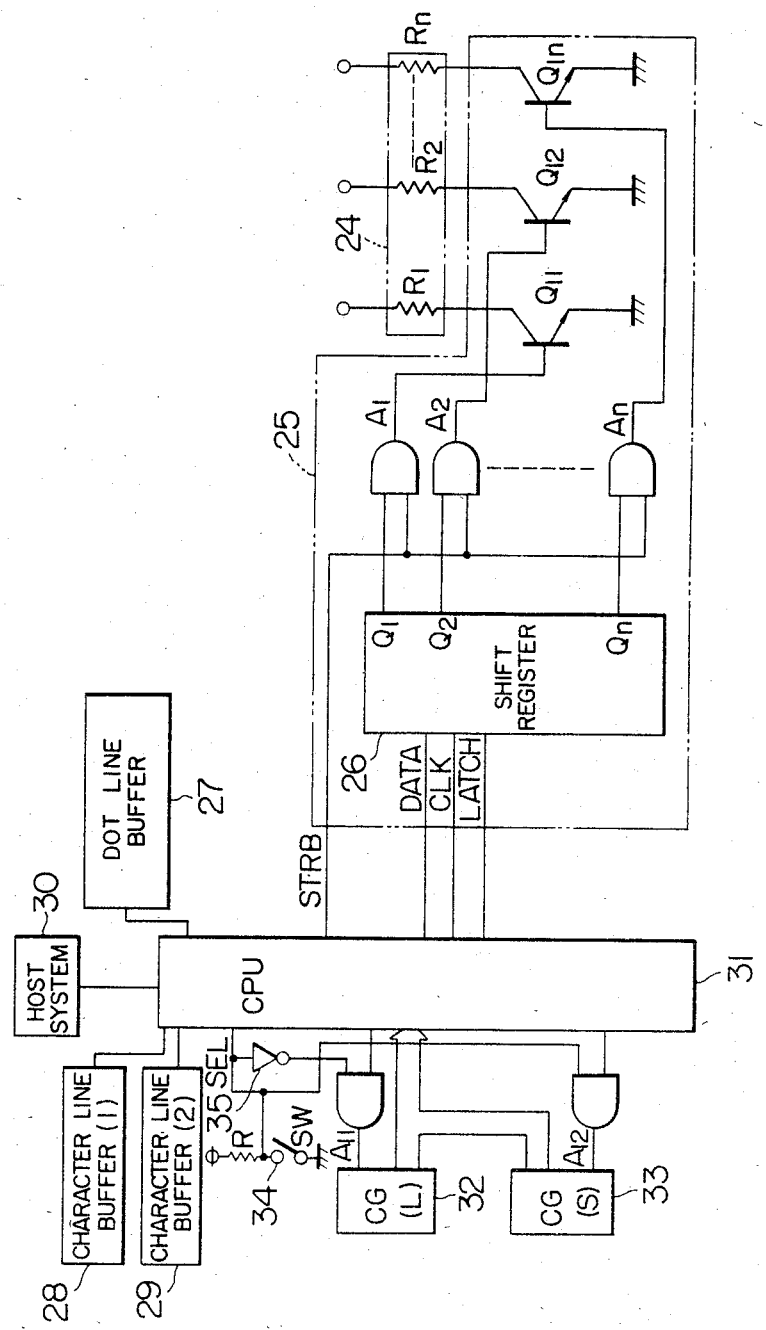
FIG. 5 is a schematic diagram showing an embodiment of the control means for 2-line simultaneous printing.
Figure 6:
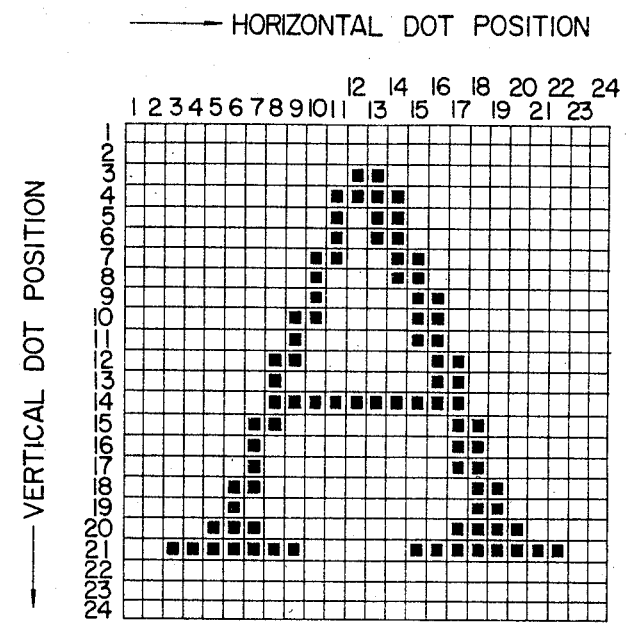
FIG. 6 is a diagram used to explain the print result in 1-line printing.
Figure 7:
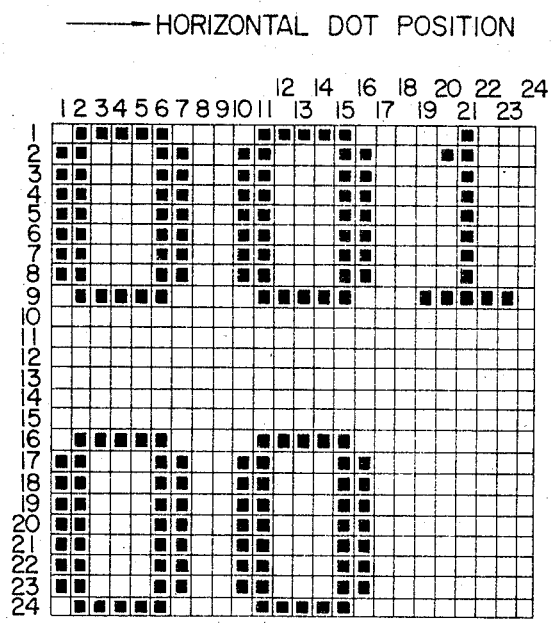
FIG. 7 is a diagram used to explain the print result in 2-line printing.
Figure 8:
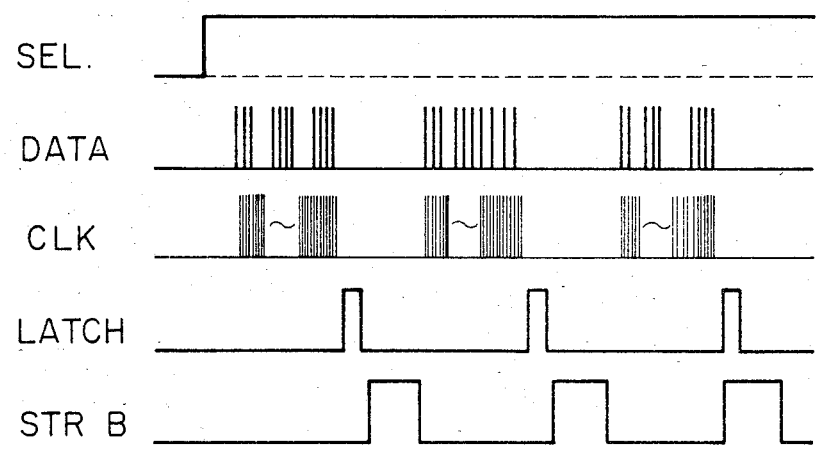
FIG. 8 is a timing chart showing the major signals of the control means.
Figure 9:
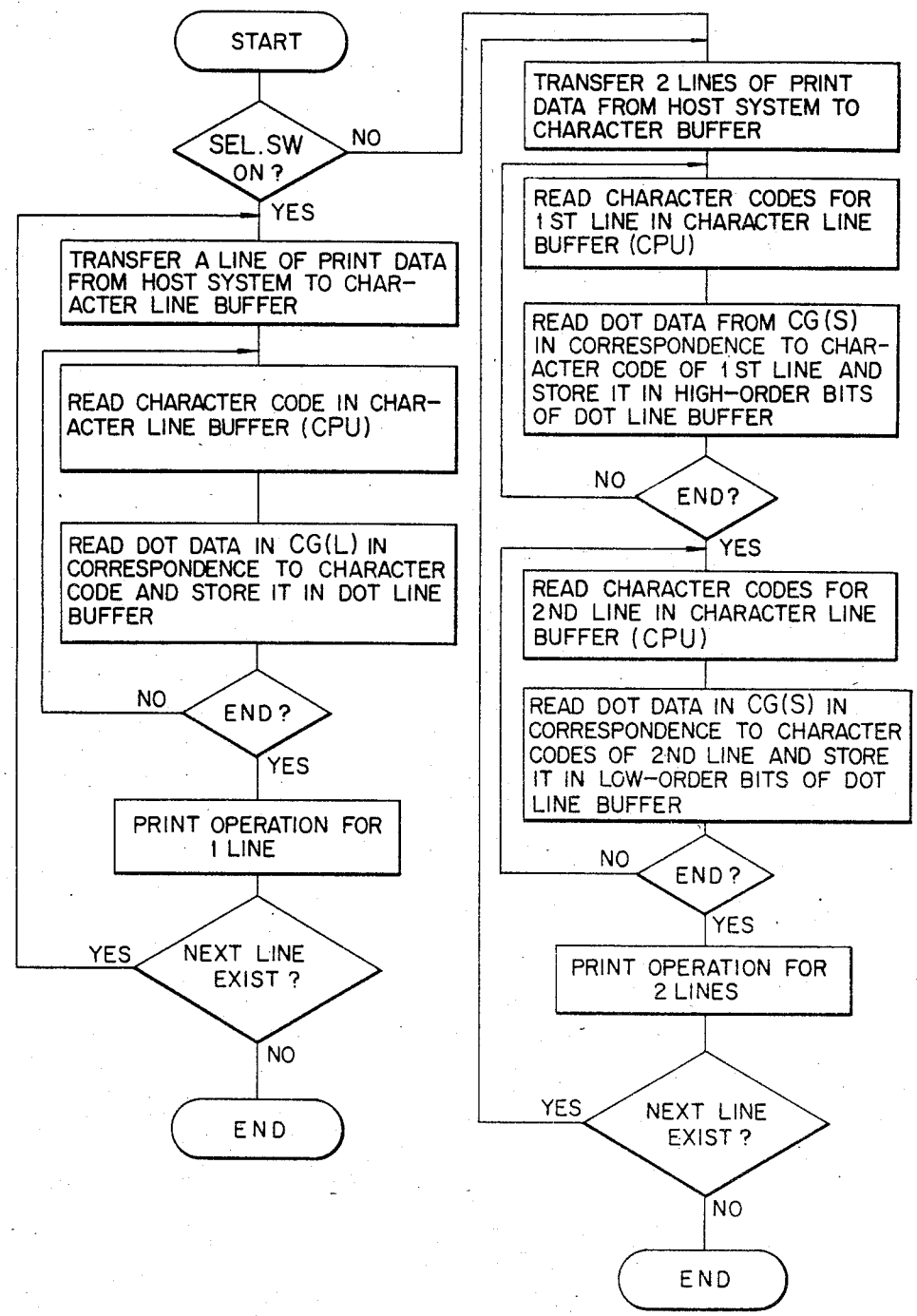
FIG. 9 is a flowchart showing the operation of the control means.

FIG. 1 is an external perspective view of the thermal transfer printer embodying the present invention, FIG. 2 is a diagram explaining briefly the carriage drive system of the printer, FIG. 3 is an enlarged external perspective view of the ribbon cassette of the printer, FIG. 4 is a diagram showing the internal arrangement of the ribbon cassette, FIG. 5 is a schematic diagram showing the control means for 2-line simultaneous printing, FIG. 6 is a diagram explaining the print result of 1-line printing, FIG. 7 is a diagram explaining the print result of 2-line simultaneous printing, FIG. 8 is a timing chart showing the major signals in the control means, and FIG. 9 is a flowchart showing the operation of the control means.

For the purpose of easy understanding, an embodiment of the thermal transfer printer for 2-line simultaneous printing will be described.

The arrangement of FIGS. 1 through 4 includes a controller 1, side boards 2, a carriage drive motor 3, a paper feed knob 4, a carriage drive belt 5, a clamp 6, a frame 7, a carriage 8, a ribbon take-up belt 9, a ribbon cassette 10, a line feed gear 11, a paper release lever 12, a line feed motor 13, a print head 14, a platen 15, a motor frame 16, and a shaft 17. The ribbon cassette contains a ribbon sensor 18, a ribbon drive pulley 19, guide pins 20, an inked ribbon 21, a ribbon take-up rubber 22, and ribbon take-up pulleys 23. In FIG. 1, the side boards 2 are secured by screws to the motor frame 16 constituting the main frame of the printer, and the frame 7 and shaft 17 are fixed by screws between the side boards 2. The line feed motor 13 is secured by screws to the side board 2, and the carriage drive motor 3 is secured by screws to the motor frame 16. The platen 15 provided with the line feed gear 11 and paper feed knob 4 is fixed rotatably between the side boards 2. The carriage 8 is mounted slidably on the shaft 17, and the print head 14 and ribbon cassette 10 are mounted on the carriage 8. The inked ribbon 21 is taken up by the gear mechanism provided on the carriage 8 and the ribbon drive belt 9. These gear mechanism and ribbon drive belt, in conjunction with the ribbon drive pulley 19, guide pins 20, ribbon take-up rubber 22 and ribbon take-up pulley 23, as will be described later, constitute the ribbon take-up mechanism. For the explanatory convenience, the printer is assumed to be of unidirectional printing (printing takes place only when the carriage 8 moves from left to right), and the inked ribbon 21 is taken up only when the carriage 8 moves from left to right.

The drive belt 9 is fixed on the side board 2 by the clamp 6. The carriage drive motor 3, line feed motor 13 and thermal print head 14 are operated by the controller 1 as shown by the arrows in FIG. 1. When the carriage 8 fixed on the carriage drive belt 5 is moved from left to right by the rotation of the carriage drive motor 3, the inked ribbon 21 in the ribbon cassette 10 is taken up, while it is stationary when the carriage is moved reversely.

In FIGS. 3 and 4, the ribbon take-up force is produced by the inked ribbon drive mechanism on the carriage 8 and transmitted to the ribbon drive pulley 19. The transmitted force is used to take up the inked ribbon 21 through the ribbon take-up rubber 22 which is pressed to both coiled ribbons 21 as shown in FIG. 4. The ribbon take-up rubber 22 runs between the ribbon take-up pulley 23 and the ribbon drive pulley 19, and the inked ribbon 21 is led by the guide pins 20. Accordingly, when the ribbon drive pulley 19 rotates, the inked ribbon 21 is taken up, while during the movement of the inked ribbon 21, the ribbon sensor 18 checks the presence of the ribbon 21.

According to this embodiment of the thermal transfer printer arranged as described above, the controller 1 is provided with a control means for printing two lines simultaneously through the use of thermal resistor elements of n in number to print characters in a height half or less than that of usual printed characters.

FIG. 5 is a schematic diagram showing the arrangement of the control means for 2-line simultaneous printing, and in this embodiment a character generator CG(S) having distinct dot matrix arrangement is provided separately from a character generator CG(L). The arrangement of FIG. 5 includes a thermal resistor array 24 consisting of thermal resistor elements $R_1$-$R_n$, a print head driver 25, a shift register (SR) 26, a dot line buffer 27 for holding data to be supplied to the shift register 26, character line buffers (1), (2) 28 and 29, a host system such as a personal computer 30, a processor (CPU) 31, a 1-line printing character generator CG(L) 32, a 2-line simultaneous printing character generator CG(S) 33, a switch SW 34, AND gates $A_1$-$A_n$, $A_{11}$ and $A_{12}$, transistors $Q_{11}$-$Q_{1n}$, a resistor R, and an inverter 35.

The 1-line printing operation will first be described. When the switch 34 is closed, the AND gate $A_{11}$ provides a high-level output in response to the input through the inverter 35, while the AND gate $A_{12}$ provides a low-level output, and the character generator CG(L) 32 is selected. Print data is transmitted from the host system 30 to the processor 31 in the form of character code, and data in the amount of one line is stored in the character line buffer (1) 28. Subsequently, the processor 31 reads a character code provided by the character line buffer (1) 28 and operates on the character generator CG(L) 32 to produce dot-matrix data, which is then stored in the dot line buffer 27. These operations are repeated so that 1-line character code data in the character line buffer (1) 28 are all converted into dot matrix data and stored in the dot line buffer 27.

The processor 31 sends print data (DATA) in the dot line buffer 27 over the data lines (DATA) to the shift register 26 in synchronism with the clock (CLK), and the data is latched in stages $Q_1$-$Q_n$ of the shift register 26 by the latch signal (LATCH). When the processor 31 issues the print command signal (STRB), the transistors $Q_{11}$-$Q_{1n}$ operate to drive respective thermal resistor elements $R_1$-$R_n$ in accordance with the print data (DATA) supplied to one input of the AND gates $A_1$-$A_n$. These operations are repeated, and after one line has been printed, the paper is fed by one line, and the print operation for the next line will proceed.

FIG. 6 shows the result of printing (for one character "A").

Next, the 2-line simultaneous printing operation will be described. When the switch 34 is opened, the AND gate $A_{11}$ provides a low-level output, while the AND gate $A_{12}$ provides a high-level output, resulting in a selection of the character generator CG(S). Print data is transmitted from the host system 30 to the processor 31 in the form of character code. Data for one line is stored in the character line buffer (1) 28, and data for the next line is stored in the character line buffer (2) 29. Subsequently, the processor 31 reads character codes in the character line buffer (1) 28 and operates on the character generator CG(S) 33 to produce dot matrix data corresponding to that character code data and stores them in the dot line buffer 27. This operation produces print data for one line in the dot line buffer 27. Furthermore, the processor 31 reads character codes in the character line buffer (2) 29 and operates on the character generator CG(S) 33 to produce dot matrix data corresponding to that character code data, and stores them in the dot line buffer 27. Thus, dot matrix data for two lines are prepared.

Subsequently, the processor 31 sends print data (DATA) in the dot line buffer 27 over the data line (DATA) to the shift register 26 in synchronism with the clock (CLK), and the data is latched in stages $Q_1$-$Q_n$ of the shift register 26 by the latch signal (LATCH). When the processor 31 issues the print command signal (STRB), the transistors $Q_{11}$-$Q_{1n}$ operate to drive respective thermal resistor elements $R_1$-$R_n$ of the print head in accordance with the print data (DATA) supplied to one input of the AND gates $A_1$-$A_n$. These operations are repeated, and after one line has been printed, the paper is fed by one line, and the print operation for the next line will proceed.

FIG. 7 shows an example of print by 2-line printing, where "001" and "00" on two lines have been printed simultaneously. In the above operation, a thermal resistor array of 24 elements is used.

FIG. 8 shows in a timing chart the major signals related to the operation, and FIG. 9 shows in the form of flowhcart the 1-line and 2-line printing operations.

The following gives a supplementary explanation about the SEL signal which has appeared in FIG. 5. The SEL signal indicates to the processor 31 whether the printer is in 1-line print mode or 2-line print mode. As an alternative arrangement, it is possible that the host system 30 indicates 1-line printing or 2-line printing to the processor 31, and in this case the switch 34, registor R and inverter 35 for switching the operating mode become unnecessary.

The character generator CG(L) 32 provides "1"s data in correspondence to black dot sections of characters and "0"s data in correspondence to white sections as shown by character "A" in FIG. 6. The character generator CG(S) 33 provides similar data, but using a smaller number of dots in the height of character half or less than that of characters generated by the CG(L) 32. The dot matrix arrangement shown in FIG. 7 provides the height of character 9/24 = ⅜ that of the CG(L).

This embodiment achieves 2-line simultaneous printing by an extremely simple, and thus less expensive, circuit arrangement, while doubling the print speed, and it can be very attractive as a printer associated with a personal computer. In addition, 2-line simultaneous printing uses less amount of paper and ribbon, and this is of benefit to the user.

While the foregoing embodiment uses two character generators providing different dot matrix arrangements, the following will describe another embodiment in which a single character generator is used commonly for the two printing modes.

Figure 10:
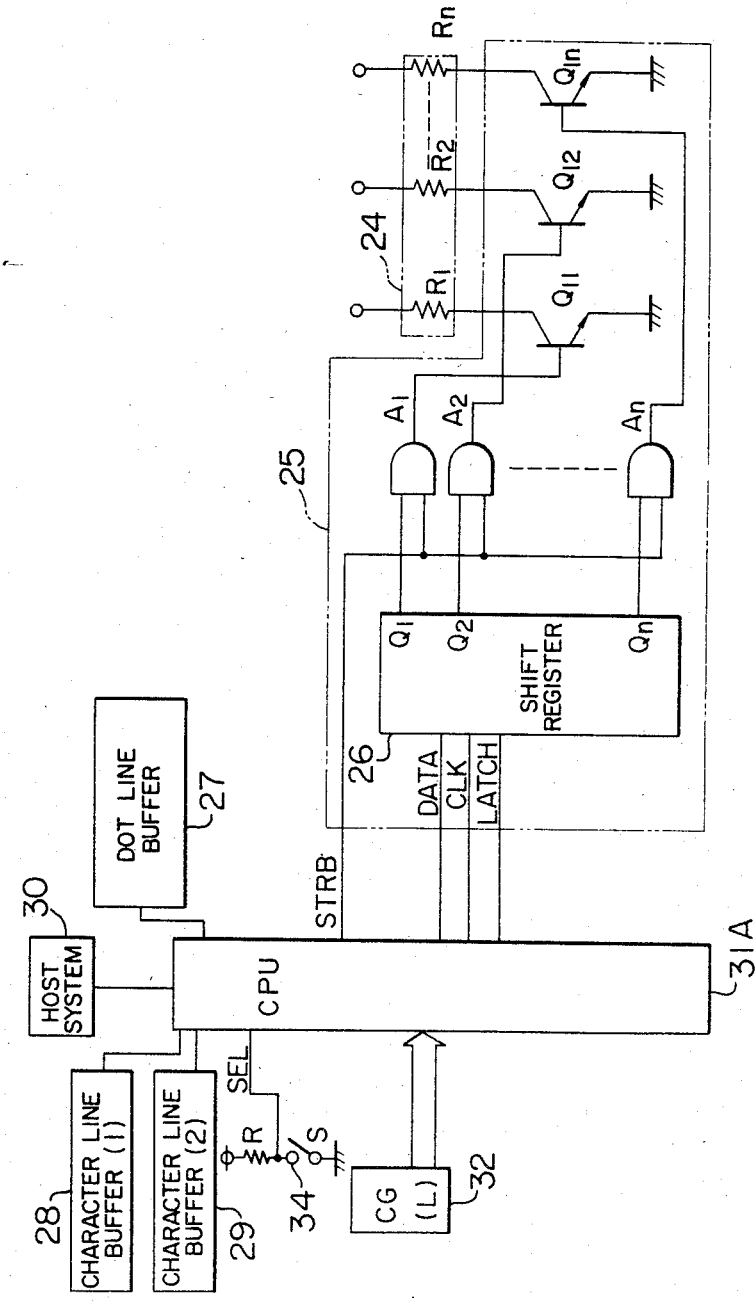
FIG. 10 is a schematic diagram showing an embodiment of the control means for 2-line simultaneous printing according to another embodiment of the thermal transfer printer.
Figure 11:
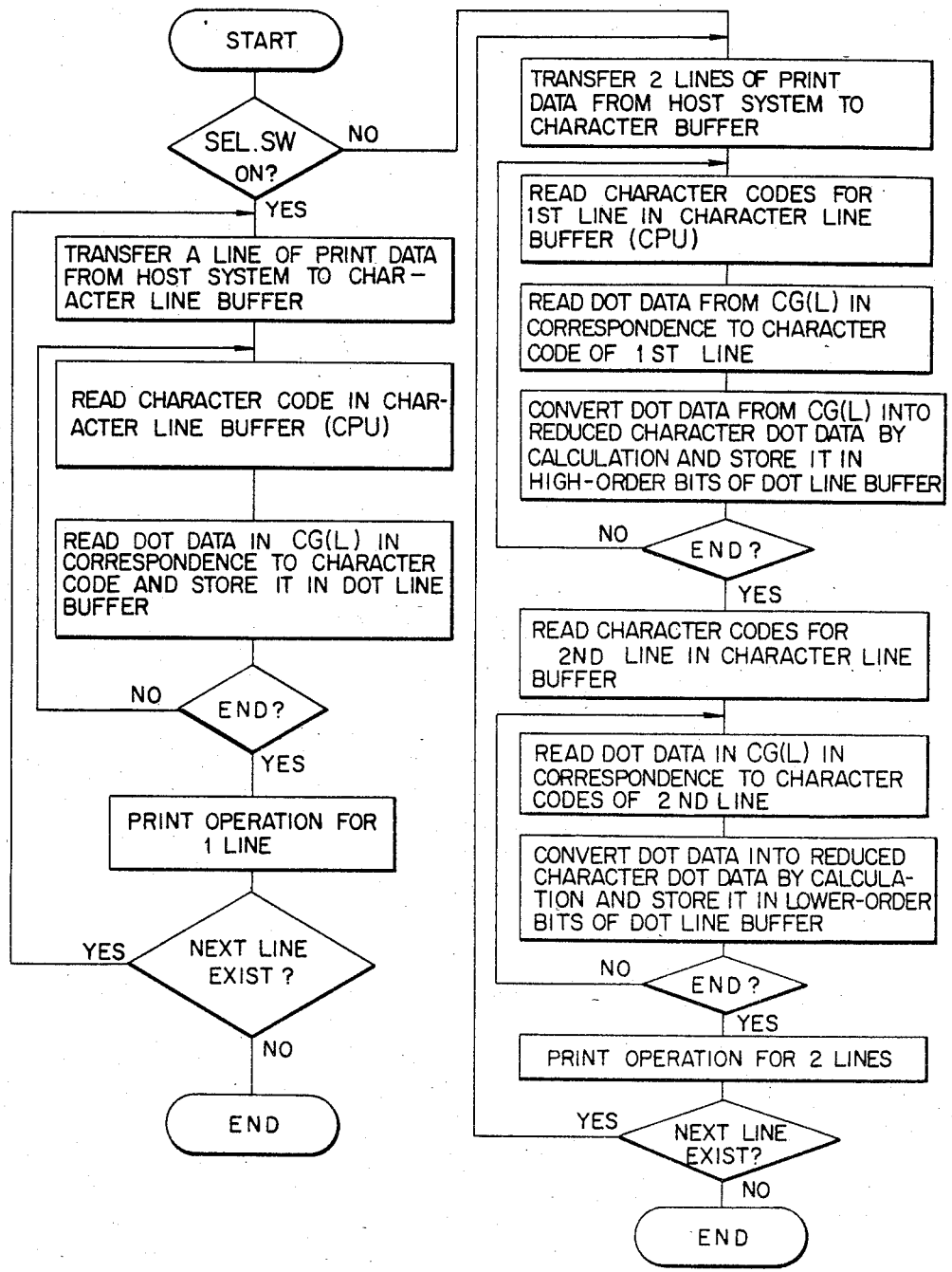
FIG. 11 is a flowchart showing the operation of the control means shown in FIG. 10.

FIG. 10 is a schematic diagram of the control means for 2-line simultaneous printing provided in the thermal transfer printer according to the second embodiment, and FIG. 11 is a flowchart showing the operation of the control means. In FIGS. 5 and 10, like symbols denote like functional elements, and reference number 31A in FIG. 10 denotes a processor which processes data from the character generator of 1-line printing mode to produce data for 2-line printing.

The arrangement of this embodiment differs from that of the previous embodiment in that the character generator CG(L) 32 is used for both 1-line and 2-line printing modes, and dot matrix print data for 1-line printing is processed by the processor 31A to provide the same print data as produced by the character generator CG(S) 33 in the previous embodiment. This arrangement eliminates the need for the character generator CG(S) 33 and related circuitries, thereby simplifying the circuit arrangement in implementing the same effect.

The method of producing the same data as of the character generator CG(S) 33 through the process for dot matrix data of 1-line printing provided by the character generator CG(L) 32 is of a known technique and explanation thereof is omitted. The operation is shown in FIG. 11, and it is identical to the case of FIG. 5 except for the print data generation as mentioned above.

Both of the foregoing embodiments are arranged to perform 2-line simultaneous printing in a character height half or less, i.e., $\frac{3}{8}$, than that of usual printed characters, and it is also possible to arrange the control means to have a capacity of buffer memory so as to perform 3-line simultaneous printing in a character height $\frac{1}{3}$ that of usual printed characters. Similarly, arrangement for simultaneous printing for multiple lines, such as 4-line simultaneous printing, is possible.

Although the foregoing embodiments are thermal transfer printers, the present invention can extensively be applied to thermal printers using thermosensitive paper as well.

The effectiveness of the present invention is summarized as follows.

(1) The print speed is briefly doubled due to simultaneous printing for multiple lines.

(2) The consumption of paper and ribbon or thermosensitive paper in multiple-line simultaneous printing mode is reduced to $\frac{1}{2}$ or less.

We claim:

1. A serial-type thermal printer provided in a controller thereof with a dot-matrix data converter which transforms print data supplied in the form of symbolized character code from a host system or the like into dot matrix data, a dot line buffer for storing converted dot matrix data, and a shift register which receives dot matrix data from said dot line buffer in correspondence to a plurality of aligning thermal resistor elements provided in a print head, a head driver for said thermal resistor elements being activated by data in said shift register in a timing relationship with the movement of said print head, wherein said dot-matrix data converter performs distinct dot-matrix arrangement for characters to make character height half or less than that of usual printed character, a plurality of lines of dot matrix data for contracted characters being stored in said dot line buffer, the contents of said dot line buffer being transferred to said shift register for activating said head driver.

* * * * *